(12) United States Patent
Oliverio et al.

(10) Patent No.: US 9,669,756 B2
(45) Date of Patent: Jun. 6, 2017

(54) UNDER VEHICLE ILLUMINATION

(71) Applicant: Nissan North America, Inc., Franklin, TN (US)

(72) Inventors: Sean Oliverio, Walled Lake, MI (US); Randall Johnson, White Lake, MI (US)

(73) Assignee: Nissan North America, Inc., Franklin, TN (US)

( * ) Notice: Subject to any disclaimer, the term of this patent is extended or adjusted under 35 U.S.C. 154(b) by 5 days.

(21) Appl. No.: 14/499,355

(22) Filed: Sep. 29, 2014

(65) Prior Publication Data

US 2016/0090026 A1    Mar. 31, 2016

(51) Int. Cl.
*B60Q 1/24* (2006.01)
*B60Q 1/26* (2006.01)
*B60Q 1/32* (2006.01)
*B60Q 1/00* (2006.01)

(52) U.S. Cl.
CPC ......... *B60Q 1/2696* (2013.01); *B60Q 1/0035* (2013.01); *B60Q 1/32* (2013.01)

(58) Field of Classification Search
CPC ...................................................... B60Q 1/323
USPC ................................ 362/495, 549, 523, 505
See application file for complete search history.

(56) References Cited

U.S. PATENT DOCUMENTS

| | | | |
|---|---|---|---|
| 1,688,497 A * | 10/1928 | Hundley | B60Q 1/26 362/548 |
| 5,893,638 A * | 4/1999 | Hufner | B60Q 1/32 340/468 |
| 6,077,576 A | 6/2000 | Osborn | |
| 6,250,785 B1 | 6/2001 | Mallia et al. | |
| 6,392,559 B1 * | 5/2002 | Sharpe, Jr. | B60Q 1/323 340/12.22 |
| 6,416,209 B1 * | 7/2002 | Abbott | B60Q 1/263 362/327 |
| 6,623,151 B2 * | 9/2003 | Pederson | B60Q 1/2611 340/815.45 |
| 6,700,502 B1 * | 3/2004 | Pederson | B60Q 1/2611 340/463 |
| 6,997,591 B2 * | 2/2006 | Krumholz | B60Q 1/50 362/340 |
| 8,235,568 B2 * | 8/2012 | Heiden | B60Q 1/24 362/249.02 |

(Continued)

FOREIGN PATENT DOCUMENTS

WO    2013061036 A1    5/2013

*Primary Examiner* — Bryon T Gyllstrom
(74) *Attorney, Agent, or Firm* — Young Basile Hanlon & MacFarlane, P.C.

(57) ABSTRACT

A vehicle is constructed to include an upper body and an underbody underlying the upper body. The upper body includes a longitudinal first side section and an opposing longitudinal second side section, and the underbody has a first perimeter portion underlying the upper body's first side section and a second perimeter portion underlying the upper body's second side section. The vehicle further includes a lighting system for illuminating the ground beneath the vehicle. The lighting system includes one or more first side lighting elements mounted at the underbody's first side perimeter portion. At least one of the one or more first side lighting elements is oriented to emit light across the vehicle's underbody and illuminate the ground beneath the upper body's second side section.

13 Claims, 7 Drawing Sheets

(56) References Cited

U.S. PATENT DOCUMENTS

| | | | |
|---|---|---|---|
| 2003/0095415 A1* | 5/2003 | Carter | B60Q 1/323 362/488 |
| 2004/0217855 A1* | 11/2004 | Wang | B60Q 1/32 340/468 |
| 2005/0036327 A1* | 2/2005 | Patel | B60Q 1/32 362/487 |
| 2005/0093430 A1* | 5/2005 | Ibbetson | H01L 33/505 313/501 |
| 2007/0274087 A1* | 11/2007 | Herold | B60Q 1/2615 362/516 |
| 2008/0170405 A1* | 7/2008 | Kamiya | B60Q 3/0216 362/495 |
| 2009/0190366 A1* | 7/2009 | Weitzel | B60Q 1/323 362/473 |
| 2012/0280528 A1* | 11/2012 | Dellock | B60R 1/06 296/1.08 |
| 2013/0229820 A1 | 9/2013 | Jutila et al. | |

* cited by examiner

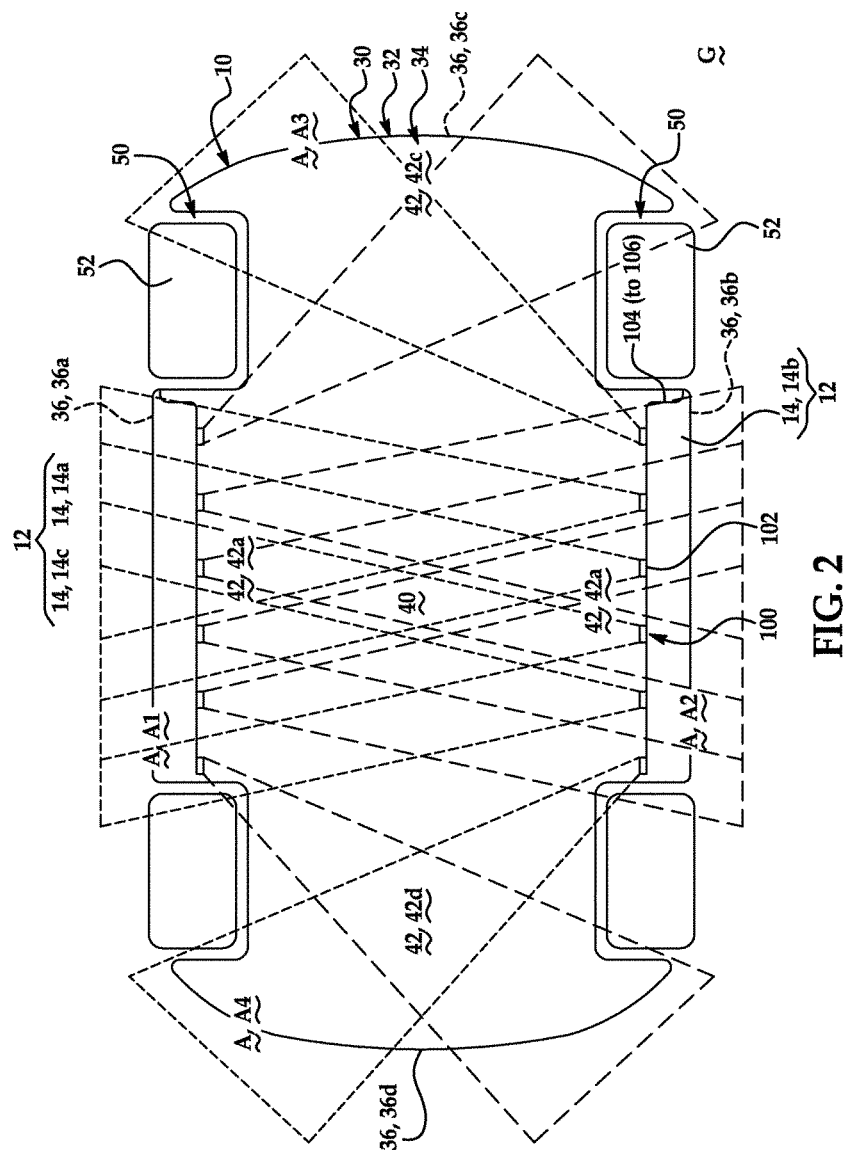

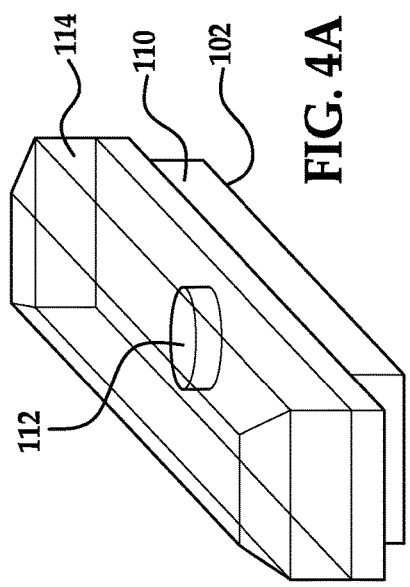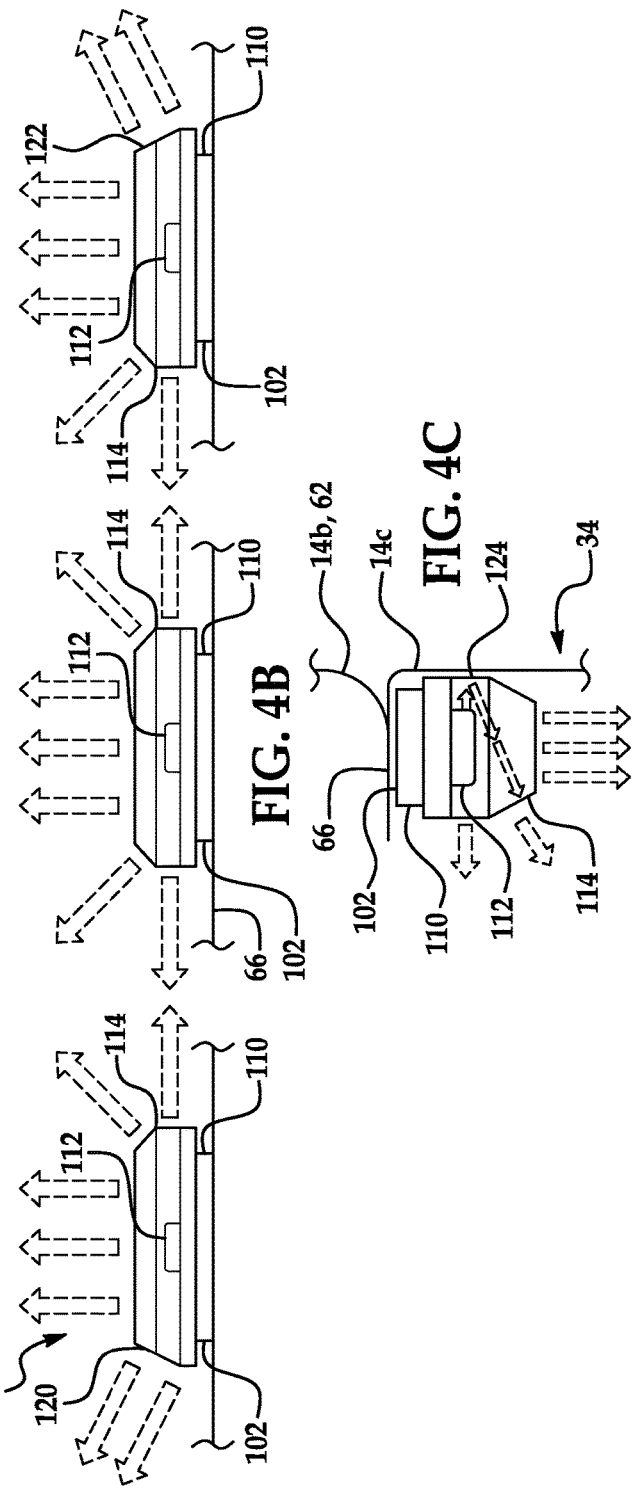

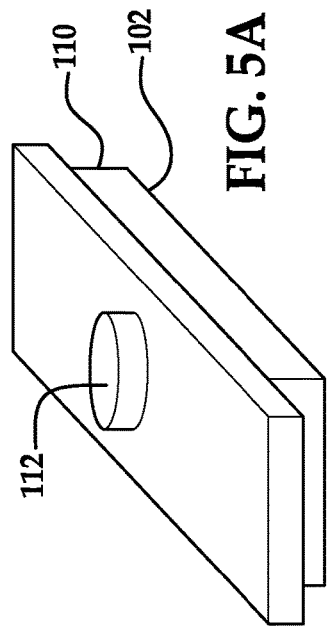
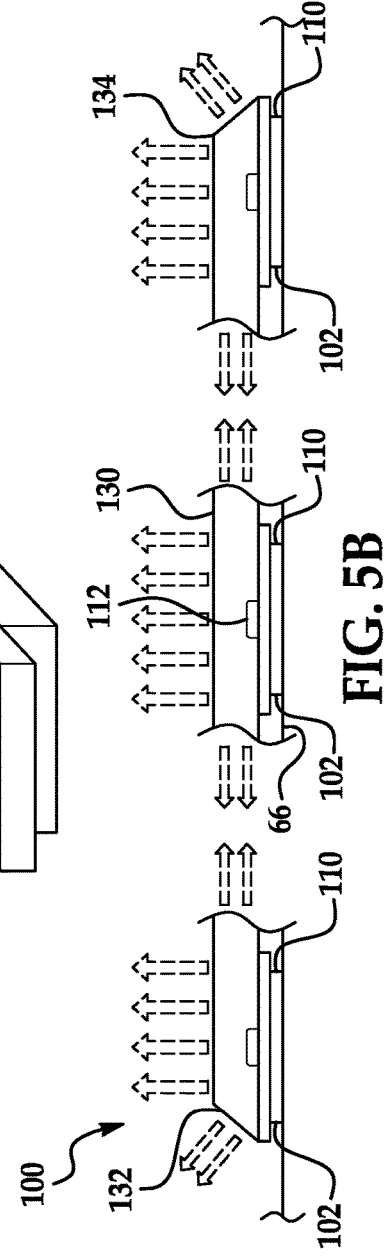
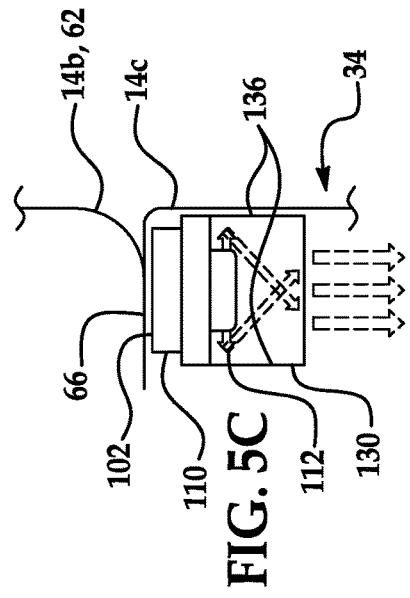

UNDER VEHICLE ILLUMINATION

TECHNICAL FIELD

The embodiments disclosed herein generally relate to the illumination of the ground beneath a vehicle.

BACKGROUND

Many if not all modern vehicles include exterior lighting systems. These exterior lighting systems may, for instance, include lighting elements for providing illumination to the exterior of a vehicle or to its surrounding areas. A common example of such an exterior lighting system may include lighting elements for providing functional or decorative illumination, or both, to the ground beneath a vehicle. In these examples the lighting elements are typically mounted in the vehicle's side view mirrors, in the front fender area near the vehicle's front door or at the vehicle's underbody.

SUMMARY

Disclosed herein are embodiments of a vehicle with systems and components for illuminating the ground beneath the vehicle. In one aspect, a vehicle includes an upper body and an underbody underlying the upper body. The upper body includes a longitudinal first side section and an opposing longitudinal second side section, and the underbody has a first perimeter portion underlying the upper body's first side section and a second perimeter portion underlying the upper body's second side section. The vehicle further includes a lighting system for illuminating the ground beneath the vehicle. The lighting system includes one or more first side lighting elements mounted at the underbody's first side perimeter portion. At least one of the one or more first side lighting elements is oriented to emit light across the vehicle's underbody and illuminate the ground beneath the upper body's second side section.

In another aspect, a method for illuminating the ground beneath a vehicle having an upper body and an underlying underbody includes the step of illuminating the ground beneath a first section of the vehicle's upper body with light emitted across the vehicle's underbody from a lighting element mounted at a perimeter portion of the vehicle's underbody that underlies a second section of the vehicle's upper body.

In yet another aspect, a vehicle includes an upper body including a longitudinal passenger side section with a pair of passenger side wheel wells and an opposing longitudinal driver side section with a pair of driver side wheel wells. The vehicle includes a plurality of passenger side LEDs mounted underneath the upper body's passenger side section between the passenger side wheel wells. At least some of the plurality of passenger side LEDs is oriented to illuminate the ground beneath the upper body's driver side section.

These and other aspects will be described in additional detail below.

BRIEF DESCRIPTION OF THE DRAWINGS

The description herein makes reference to the accompanying drawings wherein like reference numerals refer to like parts throughout the several views, and wherein:

FIG. 2 is a bottom view of the vehicle schematically showing the location and operation of the lighting system's lighting elements;

FIGS. 4A-C, 5A-C, and 6A and 6B are different views of example constructions for the lighting system's lighting elements.

DETAILED DESCRIPTION

The vehicle according to this description includes a lighting system for illuminating the ground beneath the vehicle. The lighting system includes one or more lighting elements at the vehicle's underbody. Each lighting element in operation illuminates the ground beneath a given upright section of the vehicle's upper body, but is mounted across the underbody, for example, at a portion of the underbody underlying a different upright section of the upper body. With this arrangement, the light emitted by the lighting element spreads, prior to illuminating the ground, as it crosses the underbody. This arrangement reduces or eliminates the so-called "hot spots" that would otherwise appear if the lighting element was mounted at a portion of the underbody underlying the given section of the upper body to illuminate the ground beneath it.

Figure 1A:
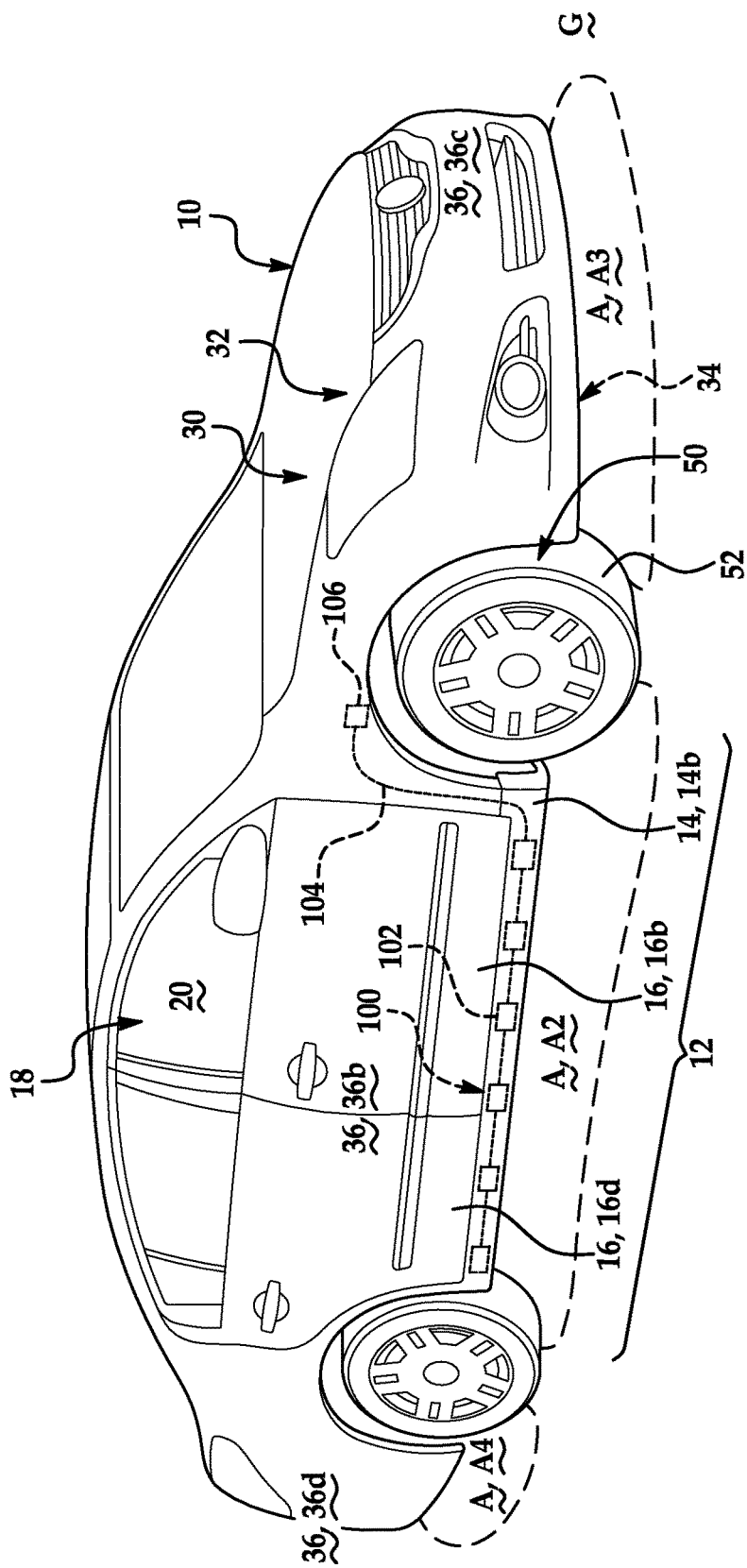
FIGS. 1A and 1B are front perspective views of a vehicle having a lighting system for illuminating areas of the ground beneath the vehicle.
Figure 1B:
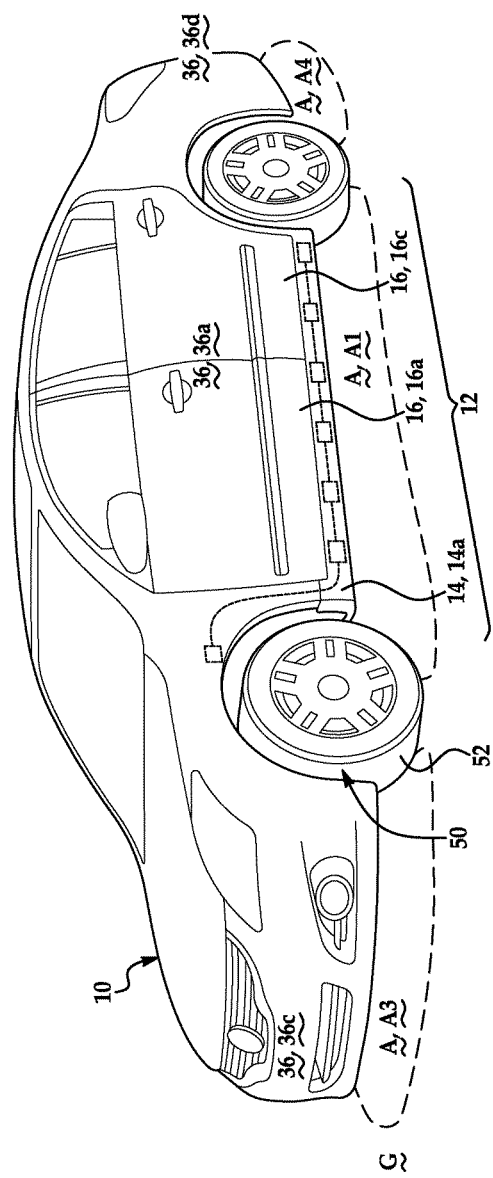

A representative vehicle 10 is shown in FIGS. 1A and 1B. The vehicle 10 has a vehicle body structure 12, which is generally comprised of a number of frame members 14 and vehicle body members 16, and is at least partially open to define one or more window openings 18. In this description, references to a frame member 14 or a vehicle body member 16 should be understood as encompassing structural components as well as any exterior or interior panels, upholstery or trim pieces.

The window openings 18 are each sized and shaped to accommodate a respective window panel 20 that, together with the frame members 14, the vehicle body members 16 and other window panels 20, at least partially defines an exterior 30 of the vehicle 10. As shown, the exterior 30 of the vehicle 10 generally includes an upper body 32 and an underlying underbody 34.

The upper body 32 has a number of upright sections 36 including a longitudinal driver side section 36a, a longitudinal passenger side section 36b, a transverse front fascia section 36c spanning the driver side section 36a and the passenger side section 36b at the front of the vehicle 10, and a transverse rear fascia section 36d spanning the driver side section 36a and the passenger side section 36b at the rear of the vehicle 10.

With additional reference to FIG. 2, the underbody 34 generally spans the upright sections 36 of the upper body 32, and includes a central portion 40 and a perimeter 42 bordering the juncture of the underbody 34 with the upright sections 36 of the upper body 32. As shown, the perimeter 42 of the underbody 34 includes a driver side perimeter portion 42a underlying the driver side section 36a of the upper body 32, a passenger side perimeter portion 42b underlying the passenger side section 36b of the upper body 32, a front perimeter portion 42c underlying the front fascia section 36c of the upper body 32, and a rear perimeter portion 42d underlying the rear fascia section 36d of the upper body 32.

The exterior 30 of the vehicle also has two pairs of opposing wheel wells 50. Each wheel well 50 is defined at the underbody 34 and opens to the upper body 32 to accommodate a wheel 52. As shown, one pair of wheel wells 50 is defined at the driver side perimeter portion 42a, while the other pair of wheel wells 50 is defined at the passenger side perimeter portion 42b.

The frame members 14 of the vehicle body structure 12 in the vehicle 10 include a driver side rocker member 14a and a passenger side rocker member 14b. The driver side rocker member 14a and the passenger side rocker member 14b each extend longitudinally generally between a respective pair of wheel wells 50. In the illustrated vehicle 10, the driver side rocker member 14a forms the juncture of the underbody 34 with the driver side section 36a of the upper body 32 and at least partially defines the driver side perimeter portion 42a of the underbody 34, while the passenger side rocker member 14b forms the juncture of the underbody 34 with the passenger side section 36b of the upper body 32 and at least partially defines the passenger side perimeter portion 42b of the underbody 34. As shown in FIG. 2, the frame members 14 further include a floor pan 14c. The floor pan 14c generally defines the central portion 40 of the underbody 34, and as generally shown, may at least partially define one or more portions of the perimeter 42 of the underbody 34, such as the driver side perimeter portion 42a and the passenger side perimeter portion 42b, for instance.

The vehicle body members 16 of the vehicle body structure 12 in the vehicle 10 include a front driver side door 16a, a front passenger side door 16b, a rear driver side door 16c and a rear passenger side door 16d, which are each pivotally connected to the vehicle body structure 12 as closure panels that permit ingress to and egress from an interior of the vehicle 10. In the illustrated vehicle 10, the front driver side door 16a and the rear driver side door 16c are located above the driver side rocker member 14a and collectively at least partially define the driver side section 36a of the upper body 32, while the front passenger side door 16b and the rear passenger side door 16d are located above the passenger side rocker member 14b and collectively at least partially define the passenger side section 36b of the upper body 32.

The vehicle 10 further includes a lighting system 100 for illuminating the ground G beneath the vehicle 10. The lighting system 100 includes, among other components discussed in additional detail below, one or more lighting elements 102 that are generally configured to produce and emit light.

The one or more lighting elements 102 are mounted at the underbody 34 of the vehicle 10 for illuminating the ground G beneath the vehicle 10. Specifically, the lighting elements 102 are mounted at the underbody 34 of the vehicle 10, and in operation, may illuminate one, some or all of the areas A of the ground G beneath the upright sections 36 of the upper body 32. According to the example vehicle 10, the areas A may include an area A1 beneath the driver side section 36a, an area A2 beneath the passenger side section 36b, an area A3 beneath the front fascia section 36c and an area A4 beneath the rear fascia section 36d. Each area A may extend the full or partial extent of its corresponding upright section 36 of the upper body 32, and may encompass one or more of the ground G directly beneath the corresponding upright section 36, the ground G inboard of the corresponding upright section 36 and the ground G outboard of the corresponding upright section 36.

The character of the illumination of an area A of the ground G beneath the vehicle 10 may improve with, among things, increasing intensity. For generally directional light sources, such as the illustrated lighting elements 102, increasing intensity can be achieved with increasing amounts of light emitted from individual lighting elements 102, with increasing numbers of lighting elements 102, or both. However, in the common case where the lighting elements 102 for illuminating an area A of the ground G beneath a given upright section 36 of the upper body 32 are mounted at the portion of the perimeter 42 of the underbody 34 underlying the given upright section 36, increasing amounts of light emitted from individual lighting elements 102 can create or enhance the appearance of hot spots at locations corresponding to the positions of the lighting elements 102, decreasing the uniformity of the illumination across the area A. Moreover, cost or other constraints may be prohibitive to increasing numbers of lighting elements 102 which could otherwise increase the intensity of the illumination of the area A without enhancing the appearance of hot spots. Alternatively, a continuous lighting solution such as a light pipe (not shown) can be used to more evenly distribute light. In this instance, the light pipe can include or be covered by a lens that includes laser etching or printing to further diffuse light and achieve a desired appearance.

As explained in greater detail below, in the lighting system 100, a particular lighting element 102 for illuminating an area A of the ground G beneath a given upright section 36 of the upper body 32 can be mounted across the underbody 34 from the given upright section 36. With this arrangement, the light emitted by the lighting element 102 crosses the underbody 34 and spreads prior to illuminating the area A. This allows for increasing intensity of the illumination of the area A with relatively fewer numbers of lighting elements 102 that emit relatively higher amounts of light, with little or no appearance of hot spots.

For purposes of this description, it will be understood that the illumination of an area A of the ground G beneath a given upright section 36 of the upper body 32 by a particular lighting element 102 mounted across the underbody 34 from the given upright section 36 is not exclusive of the particular lighting element 102 also emitting light to illuminate other areas A of the ground G, whether or not the light emitted to illuminate the other areas A crosses the underbody 34 prior to illuminating the other areas A, nor is it exclusive of another lighting element 102 also emitting light to illuminate the area A, whether or not the light emitted by the other lighting element 102 crosses the underbody 34 prior to illuminating the area A.

A non-limiting example implementation of the lighting system 100 according to the general description above is shown in FIGS. 1A, 1B and 2. According to the example implementation, the one or more lighting elements 102 of the lighting system 100 may be mounted at the perimeter 42 of the underbody 34 of the vehicle 10, generally underneath the upright sections 36 of the upper body 32.

Although one or more lighting elements 102 can be mounted at one, some or all of the portions of the perimeter 42 of the underbody 34, in the example implementation, the lighting system 100 includes multiple first, passenger side lighting elements 102 mounted at the passenger side perimeter portion 42b of the underbody 34 underlying the passenger side section 36b of the upper body 32, and optionally, multiple second, driver side lighting elements 102 mounted at the driver side perimeter portion 42a of the underbody 34 underlying the driver side section 36a of the upper body 32. For brevity, the description follows with reference to the passenger side lighting elements 102. It will however be understood that the description of the passenger side lighting elements 102 is applicable in principle to the remainder of the lighting elements 102 of a given implementation of the lighting system 100, if any, including but not limited to the illustrated driver side lighting elements 102.

As generally shown, the passenger side lighting elements 102 may for example be mounted between the pair of wheel wells 50 defined at the passenger side perimeter portion 42b.

Figure 3:
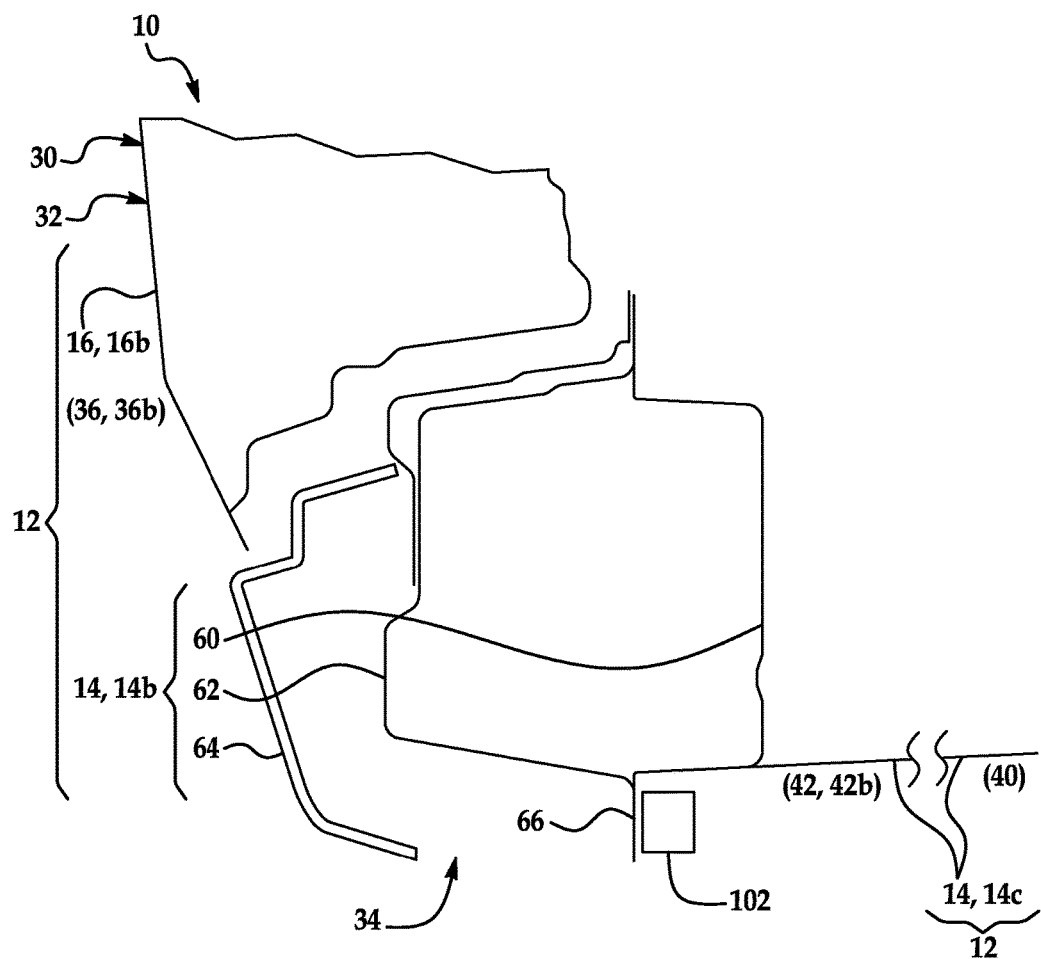
FIG. 3 is a cross sectional view of the vehicle taken at a position similar to the line A-A of FIG. 1A showing an example mounting configuration for the lighting system's lighting elements.

The passenger side lighting elements 102 can be mounted in any manner to the vehicle body structure 12 or otherwise to the exterior 30 of the vehicle 10. An example mounting configuration for the passenger side lighting elements 102 is shown in FIG. 3. As shown, the passenger side rocker member 14b can include an inner member 60, an outer member 62, and an overlying trim member 64. One or both of the inner member 60 and the outer member 62 are joined with the floor pan 14c at a longitudinally extending upright pinch flange 66. The pinch flange 66 protrudes from the remainder of the vehicle body structure 12, and according to the example mounting configuration, the passenger side lighting elements 102 are mounted to a surface of the pinch flange 66 facing the central portion 40 of the underbody 34.

With either the illustrated or other mounting configurations, the passenger side lighting elements 102 may be adhered, taped, fastened, clipped, clamped, snap-fit or otherwise attached to the vehicle body structure 12 or otherwise to the exterior 30 of the vehicle 10. Alternatively, or additionally, the passenger side lighting elements 102 can be mounted via one or more auxiliary mounting components attached to the vehicle body structure 12 or otherwise to the exterior 30 of the vehicle 10.

According to the illustrated example of the lighting system 100, the electrical power for operating the passenger side lighting elements 102 can be sourced from the electrical system for the vehicle 10. As shown, for instance, the passenger side lighting elements 102 are electrically connected to a harness 104, and the electrical system for the vehicle 10 includes an accessory service connection 106 configured to support an electrical coupling between the harness 104 and the accessory service connection 106. The harness 104 could alternatively be hardwired to the electrical system for the vehicle 10, for instance.

The passenger side lighting elements 102 are mounted at the passenger side perimeter portion 42b of the underbody 34 underlying the passenger side section 36b of the upper body 32, as pointed out above, and collectively in operation illuminate one, some or all of the area A1 beneath the opposing driver side section 36a, the area A3 beneath the adjacent front fascia section 36c and the area A4 beneath the adjacent rear fascia section 36d.

Each passenger side lighting element 102 is oriented and/or constructed to illuminate an area A of the ground G under the vehicle 10, either alone, or, for example, in combination with auxiliary optical structures. It will be understood that a particular passenger side lighting element 102 can in operation illuminate an area A by itself or in combination with other lighting elements 102, including but not limited to other passenger side lighting elements 102.

The number and spacing of the passenger side lighting elements 102, as well as their individual orientation and/or constructions, can vary depending for instance upon the size and shape of the areas A of the ground G under the vehicle 10 to be illuminated, as well as the desired intensity or other characteristics of the illumination of the areas A. According to the illustrated non-limiting example, six passenger side lighting elements 102 may be spaced between the pair of wheel wells 50 defined at the passenger side perimeter portion 42b. The passenger side lighting elements 102 according to the illustrated example include a rearmost passenger side lighting element 102 for partially illuminating the area A4 beneath the rear fascia section 36d, four central passenger side lighting elements 102 whose emitted light combines for illuminating the area A1 beneath the driver side section 36a, and one front most passenger side lighting element 102 for partially illuminating the area A3 beneath the front fascia section 36c.

Each of the passenger side lighting elements 102 can be, or include, one or more LEDs. Different non-limiting example constructions for the passenger side lighting elements 102 are shown in FIGS. 4A-C, 5A-C, and 6A and 6B. In each of the example constructions, the passenger side lighting elements 102 include a substrate 110 and one or more LEDs 112 mounted on the substrate 102. The LEDs 112 can be surface-mount LEDs, for example, configured to emit light with any of a variety of colors, color temperatures or other properties.

The example passenger side lighting elements 102 shown in FIGS. 4A-C each include the substrate 110, one LED 112 and a light transmitting lens 114 enclosing the LED 112. The lens 114 in each passenger side lighting element 102 can for example be potted over the LED 112 to the substrate 110 to protect the LED 112, and optionally the substrate 110, from water, mud, debris or other environmental contamination.

The lenses 114 of these example passenger side lighting elements 102 emit the light produced by their respective LEDs 112, and may include features for effecting a light distribution for the passenger side lighting elements 102 complimentary to the illumination of one or more of the areas A of the ground G under the vehicle 10.

For example, as shown in FIG. 4B, the lens 114 of the representative central passenger side lighting element 102 is generally configured to evenly distribute the light produced by its LED 112 toward the area A1 beneath the driver side section 36a for combination with the light emitted by the other central passenger side lighting elements 102, while the lens 114 of the rearmost passenger side lighting element 102 includes an angled facet 120 configured for distributing relatively more of the light produced by its corresponding LED 112 toward the area A4 beneath the rear fascia section 36d, and the lens 114 of the front most passenger side lighting element 102 includes an angled facet 122 configured for distributing relatively more of the light produced by its corresponding LED 112 toward the area A3 beneath the front fascia section 36c. Moreover, as shown in FIG. 4C, the lenses 114 of the example passenger side lighting elements 102 can include reflective material 124 disposed at a portion of the outer surface of the lenses 114 facing the underbody 34 of the vehicle 10 to deflect light that would otherwise be wasted across the under body 34.

The example passenger side lighting elements 102 shown in FIGS. 5A-C include the substrate 110 and one LED 112. The lighting system 100 according to these example passenger side lighting elements 102 further includes a light transmitting rod 130 enclosing the LEDs 112 of some or all of the spaced apart passenger side lighting elements 102 to protect the LEDs 112, and optionally the substrates 110, from water, mud, debris or other environmental contamination.

The rod 130 may optionally be configured to function as an auxiliary mounting component for the passenger side lighting elements 102. The rod 130, for instance, may be adhered, taped, fastened, clipped, clamped, snap-fit or otherwise attached to the vehicle body structure 12 or otherwise to the exterior 30 of the vehicle 10 to sandwich the passenger side lighting elements 102 to the vehicle body structure 12 or otherwise to the exterior 30 of the vehicle 10.

The rod 130 emits the light produced by the LEDs 112 of the passenger side lighting elements 102, and may include features for effecting a light distribution for the passenger side lighting elements 102 complimentary to the illumination of one or more of the areas A of the ground G under the vehicle 10.

For example, as shown in FIG. 5B, the rod 130 is generally configured to distribute the light produced by the LED 112 of the representative central passenger side lighting element 102 both toward the area A1 beneath the driver side section 36a and for combination with the light produced by the LEDs 112 of the passenger side lighting elements 102, while rod 130 includes an angled facet 132 configured for distributing relatively more of the light produced by the LED 112 of the rearmost passenger side lighting element 102 toward the area A4 beneath the rear fascia section 36d, and an angled facet 134 configured for distributing relatively more of the light produced by the LED 112 of the front most passenger side lighting element 102 toward the area A3 beneath the front fascia section 36d. Moreover, as shown in FIG. 5C, the rod 130 can include reflective material 136 disposed at a portion of the outer surface of the rod 130 facing the underbody 34 of the vehicle 10 to deflect light that would otherwise be wasted across the under body 34, and optionally, at a portion of the outer surface of the rod 130 facing the ground G to further deflect light across the under body 34.

Figure 6A:
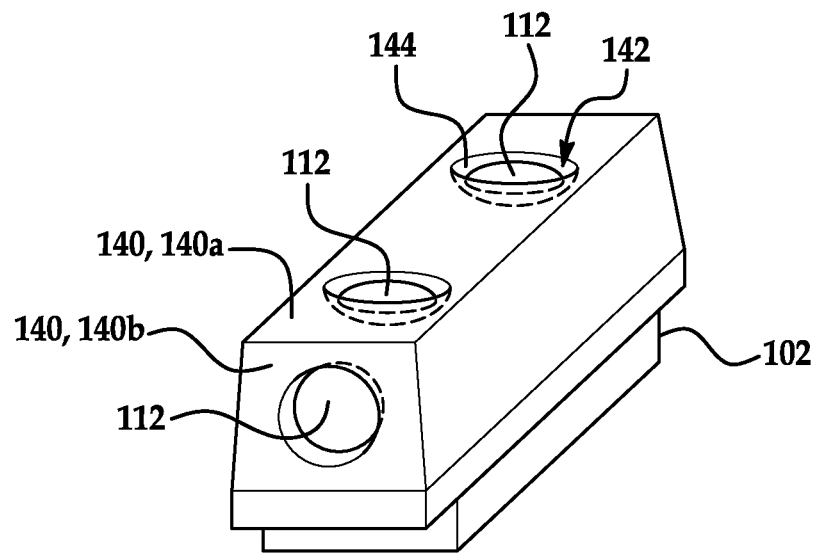
Figure 6B:
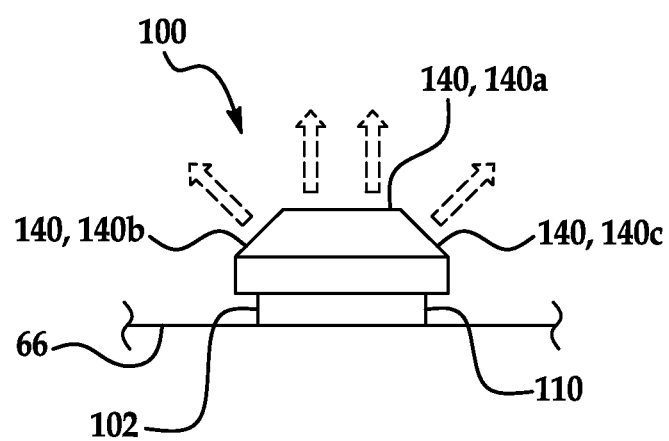

The example passenger side lighting elements 102 shown in FIGS. 6A and 6B include the substrate 110 and multiple LEDs 112. The substrate 114 of these example passenger side lighting elements 102 defines a number of mounting faces 140 for the LEDs 112 complimentary to the illumination of one or more of the areas A of the ground G under the vehicle 10.

The substrate 114 may, for example as shown, define a mounting face 140a for orienting one or more LEDs 112 mounted thereon toward the area A1 beneath the driver side section 36a, a mounting face 140b for orienting one or more LEDs 112 mounted thereon toward the area A4 beneath the rear fascia section 36d, and a mounting face 140c for orienting one or more LEDs 112 mounted thereon toward the area A3 beneath the front fascia section 36c. As shown in FIG. 6A, the mounting faces 140 can define respective concave depressions 142 in which the respective LEDs 112 are mounted. The depressions 142, and optionally the remainder of the mounting faces 140, may be chromed or otherwise include reflective material 144 for directing the light produced by the respective LEDs 112 across the under body 34.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
an upper body including a driver side section and an opposing passenger side section;
an underbody facing ground and having a first perimeter portion extending between a left front wheel well and a rear left wheel well and underlying the upper body's driver side section and a second perimeter portion extending between a right front wheel well and a right rear wheel well and underlying the upper body's passenger side section; and
a lighting system for illuminating the ground beneath the vehicle, the lighting system including:
one or more driver side lighting elements mounted at the underbody's first perimeter portion, each of the one or more driver side lighting elements oriented such that a primary light output from each of the one or more driver side lighting elements is directed to and illuminates the ground beneath the second perimeter portion; and
one or more passenger side lighting elements mounted at the underbody's second perimeter portion, each of the one or more passenger side lighting elements oriented such that a primary light output from each of the one or more passenger side lighting elements is directed to and illuminates the ground beneath the first perimeter portion,
wherein the upper body further includes a front fascia section adjacent the passenger side section, and at least one of the one or more driver side lighting elements is oriented to emit light across the vehicle's underbody and illuminate the ground beneath the upper body's front fascia section.

2. The vehicle of claim 1, wherein the upper body further includes a rear fascia section adjacent the passenger side section, and at least one of the one or more driver side lighting elements is oriented to emit light across the vehicle's underbody and illuminate the ground beneath the upper body's rear fascia section.

3. The vehicle of claim 1, wherein the vehicle further includes an electrical system, and the lighting system further includes an electrical harness electrically connecting the one or more driver side lighting elements with the vehicle's electrical system.

4. The vehicle of claim 1, wherein at least one of the one or more driver side lighting elements includes a substrate, an LED mounted to the substrate and a light transmitting lens enclosing the LED.

5. The vehicle of claim 4, wherein the lens has an outer surface, and a portion of the lens's outer surface facing the underbody includes a reflective material to direct emitted light across the vehicle's underbody.

6. The vehicle of claim 1, wherein the one or more driver side lighting elements includes multiple, spaced apart lighting elements each including a substrate and an LED mounted to the substrate, and the lighting system further includes a light transmitting light rod enclosing the LEDs of the multiple lighting elements.

7. The vehicle of claim 1, wherein at least one of the one or more driver side lighting elements includes a substrate defining a depression and an LED mounted within the depression, and the depression includes a reflective material to direct emitted light across the vehicle's underbody.

8. A method for illuminating the ground beneath the vehicle of claim 1, the method comprising:
illuminating the ground beneath the first perimeter portion of the underbody of the driver side section with the one or more passenger side lighting elements; and
illuminating the ground beneath the second perimeter portion of the underbody of the passenger side section with the one or more driver side lighting elements.

9. A vehicle, comprising:
an upper body including a driver side section and an opposing passenger side section;

an underbody facing ground and having a first perimeter portion extending between a left front wheel well and a rear left wheel well and underlying the upper body's driver side section and a second perimeter portion extending between a right front wheel well and a right rear wheel well and underlying the upper body's passenger side section; and a lighting system for illuminating the ground beneath the vehicle, the lighting system including:
  one or more driver side lighting elements mounted at the underbody's first perimeter portion, each of the one or more driver side lighting elements oriented such that a primary light output from each of the one or more driver side lighting elements is directed to and illuminates the ground beneath the second perimeter portion; and
  one or more passenger side lighting elements mounted at the underbody's second perimeter portion, each of the one or more passenger side lighting elements oriented such that a primary light output from each of the one or more passenger side lighting elements is directed to and illuminates the ground beneath the first perimeter portion, wherein at least one of the one or more driver side lighting elements includes a substrate, an LED mounted to the substrate and a light transmitting lens enclosing the LED, and the upper body further includes a front fascia section and a rear fascia section, the lens has an outer surface, and a portion of the lens's outer surface is faceted to direct emitted light across the vehicle's underbody to illuminate the ground beneath one of the upper body's front fascia section the upper body's rear fascia section.

10. A vehicle, comprising:
an upper body including a driver side section and an opposing passenger side section;
an underbody facing ground and having a first perimeter portion extending between a left front wheel well and a rear left wheel well and underlying the upper body's driver side section and a second perimeter portion extending between a right front wheel well and a right rear wheel well and underlying the upper body's passenger side section; and
a lighting system for illuminating the ground beneath the vehicle, the lighting system including:
  one or more driver side lighting elements mounted at the underbody's first perimeter portion, each of the one or more driver side lighting elements oriented such that a primary light output from each of the one or more driver side lighting elements is directed to and illuminates the ground beneath the second perimeter portion; and
  one or more passenger side lighting elements mounted at the underbody's second perimeter portion, each of the one or more passenger side lighting elements oriented such that a primary light output from each of the one or more passenger side lighting elements is directed to and illuminates the ground beneath the first perimeter portion,
wherein the upper body further includes a rear fascia section adjacent the passenger side section, and at least one of the one or more driver side lighting elements is oriented to emit light across the vehicle's underbody and illuminate the ground beneath the upper body's rear fascia section.

11. The vehicle of claim 10, wherein the upper body further includes a front fascia section adjacent the passenger side section, and at least one of the one or more driver side lighting elements is oriented to emit light across the vehicle's underbody and illuminate the ground beneath the upper body's front fascia section.

12. A vehicle, comprising:
an upper body including a driver side section and an opposing passenger side section;
an underbody facing ground and having a first perimeter portion extending between a left front wheel well and a rear left wheel well and underlying the upper body's driver side section and a second perimeter portion extending between a right front wheel well and a right rear wheel well and underlying the upper body's passenger side section; and
a lighting system for illuminating the ground beneath the vehicle, the lighting system including:
  one or more driver side lighting elements mounted at the underbody's first perimeter portion, each of the one or more driver side lighting elements oriented such that a primary light output from each of the one or more driver side lighting elements is directed to and illuminates the ground beneath the second perimeter portion; and
  one or more passenger side lighting elements mounted at the underbody's second perimeter portion, each of the one or more passenger side lighting elements oriented such that a primary light output from each of the one or more passenger side lighting elements is directed to and illuminates the ground beneath the first perimeter portion,
wherein at least one of the one or more driver side lighting elements includes a substrate, an LED mounted to the substrate and a light transmitting lens enclosing the LED, the lens having an outer surface, and a portion of the lens's outer surface facing the underbody includes a reflective material to direct emitted light across the vehicle's underbody.

13. A method for illuminating the ground beneath the vehicle of claim 12, the method comprising:
illuminating the ground beneath the first perimeter portion of the underbody of the driver side section with the one or more passenger side lighting elements; and
illuminating the ground beneath the second perimeter portion of the underbody of the passenger side section with the one or more driver side lighting elements.

* * * * *